United States Patent
Muller et al.

(10) Patent No.: US 7,780,322 B2
(45) Date of Patent: Aug. 24, 2010

(54) VEHICLE MIRROR WITH ORGANIC LIGHT-EMITTING DISPLAY

(75) Inventors: Wolfgang Muller, Wermelskirchen (DE); Bernard Hilbert, Cappel (FR)

(73) Assignee: Johnson Controls Interiors GmbH & Co. KG (DE)

( * ) Notice: Subject to any disclaimer, the term of this patent is extended or adjusted under 35 U.S.C. 154(b) by 0 days.

(21) Appl. No.: 11/915,167

(22) PCT Filed: May 17, 2006

(86) PCT No.: PCT/EP2006/062358

§ 371 (c)(1), (2), (4) Date: Jun. 10, 2008

(87) PCT Pub. No.: WO2006/125737

PCT Pub. Date: Nov. 30, 2006

(65) Prior Publication Data

US 2009/0116256 A1 May 7, 2009

(30) Foreign Application Priority Data

May 27, 2005 (DE) .................. 10 2005 024 837

(51) Int. Cl.
*B60Q 1/00* (2006.01)

(52) U.S. Cl. .................. 362/492; 362/84; 313/504

(58) Field of Classification Search .......... 362/84, 362/85, 86, 88, 97.3, 488, 492, 540, 543, 362/544, 545, 80; 313/498, 499, 504, 512

See application file for complete search history.

(56) References Cited

U.S. PATENT DOCUMENTS

| | | | | |
|---|---|---|---|---|
| 4,421,355 A | * | 12/1983 | Marcus | 296/97.5 |
| 6,497,504 B2 | * | 12/2002 | Macher et al. | 362/492 |
| 6,499,868 B1 | | 12/2002 | Kerul, Jr. | |
| 7,258,470 B2 | * | 8/2007 | Ogawa | 362/492 |
| 2004/0097005 A1 | | 5/2004 | Daniels | |
| 2004/0196661 A1 | | 10/2004 | Lynam et al. | |
| 2005/0135087 A1 | * | 6/2005 | Mita et al. | 362/135 |
| 2006/0181893 A1 | * | 8/2006 | Fernandez et al. | 362/494 |
| 2006/0198123 A1 | * | 9/2006 | Radu | 362/135 |

FOREIGN PATENT DOCUMENTS

| | | |
|---|---|---|
| DE | 39 32 808 | 4/1991 |
| DE | 91 02 249 | 5/1991 |
| WO | WO 03/055708 | 7/2003 |
| WO | WO 03/102643 | 12/2003 |

* cited by examiner

*Primary Examiner*—Hargobind S Sawhney
(74) *Attorney, Agent, or Firm*—Dickinson Wright PLLC

(57) ABSTRACT

The invention relates to a mirror in a motor vehicle, in particular a make-up lighted or/vanity style mirror. At least one preferably reflective organic light-emitting diode display abuts the periphery of said mirror.

7 Claims, 1 Drawing Sheet

VEHICLE MIRROR WITH ORGANIC LIGHT-EMITTING DISPLAY

CROSS REFERENCE TO RELATED APPLICATIONS

None.

BACKGROUND OF THE INVENTION

1. Field of the Invention

The present invention relates to a mirror in a motor vehicle, in particular a vanity mirror, at the periphery of which is arranged at least one preferably reflective OLED without a spacing.

2. Related Art

Mirrors are sufficiently known from the prior art and are nowadays equipped with additional features. By way of example, DE 101 40 689 A1 discloses a vehicle mirror comprising a mirror plate and an organic light-emitting diode display (OLED) formed from two substrates and an OLED layer, the mirror plate directly forming one of the substrates of the OLED display. In the case of said mirror it is possible to project information into the reflective surface. A further rear-view mirror with a display unit is disclosed in DE 103 25 845 A1. Furthermore, it is known from the prior art for mirrors to have illuminations. The illumination of said mirrors is based, in accordance with the prior art, on a construction composed of a housing, incandescent bulb, bulb holder, wiring, reflector and diffusing screen. These constructions have a height of several millimeters. What is more, the diffusing screen must be configured in removable fashion in order to enable a defective incandescent bulb to be exchanged. These disadvantages restrict the possible uses of such illuminations as vehicle mirror illumination, in particular as make-up mirror illumination.

Therefore, the present invention was based on the object of providing a mirror which does not have the disadvantages of the prior art.

SUMMARY OF THE INVENTION

The object is achieved by means of a mirror in a motor vehicle, in particular a vanity mirror, at the periphery of which is arranged at least one, preferably reflective, OLED without a spacing.

For the person skilled in the art, it could not be expected that the mirror according to the invention is illuminated very well. The OLEDs at the periphery of the mirror are embodied so flat that the OLEDs and the mirror can be arranged in a frame. What is more, the OLED light does not dazzle the observer. Due to the extremely high lifetime of the OLED, reversible incorporation thereof for purposes of service can be dispensed with.

A mirror within the meaning of the invention is any reflective surface which reflects a highest possible proportion, preferably about 100%, of impinging light. According to the invention, at least one OLED is arranged at the periphery of said mirror. Consequently, the OLED in the preferred embodiment is not part of said reflective surface but rather borders the reflective surface at least partly.

According to the invention, the illumination unit according to the invention has an OLED (Organic Light Emitting Diode). OLEDs constitute an electronic component which generally has a plurality of thin organic current-conducting layers. The OLEDs may be constructed so as to have a thickness of less than 3 mm, preferably less than 1.4 mm and particularly preferably <1 mm. Preferably, but by no means necessarily, the OLEDs have a transmission of >70%, and particularly preferably >75% in the non-driven state. OLEDs generally have a carrier layer, for example, glass, to which a luminous coating is applied, and a covering layer, for example, likewise glass. The carrier layer preferably has a reflective layer, which reflects the light emitted by the diodes and which acts as a mirror in the non-driven state of the diodes. The OLEDs emit a bright, diffuse light that does not dazzle. OLEDs are distinguished by a very fast response speed. By attachment of an appropriate filter, a white light-emitting OLED can be modified to emit light in any desired color. This is advantageous, for example for reading light. However, a color effect of the OLEDs can also be obtained without filters. Furthermore, OLEDs are very lightweight and have an extremely high durability, such that, by way of example, the weight of a vehicle and the replacement intervals of the illumination unit can be reduced. In general, replacement can be completely obviated on account of the long lifetime. Comparatively large-area illuminations can also be realized due to the comparatively low weight of the OLEDs.

The OLED is preferably, but not of necessity, a reflective OLED. One embodiment of the present invention has the advantage that the reflective OLED looks like a mirror in the non-driven (i.e., non-energized) state. A surface having a homogeneous reflective appearance thereby arises in association with the mirror.

The mirror may have an OLED at least at one part of the periphery of said mirror. The mirror furthermore may have a respective OLED at two opposite parts of the periphery of said mirror. The mirror and the OLED can be arranged in one plane, in particular the area that faces the user lying in one plane, although other arrangements are contemplated.

In another exemplary embodiment, the OLED is arranged in curved fashion. In yet another variation, the OLED is arranged in a manner angled with respect to the mirror. This latter embodiment has the advantage, in particular that light emitted by the OLED does not dazzle the observer, and that the OLED in the turned-off state enables three-dimensional observation for the observer.

The mirror and the OLED may be arranged in a mirror cassette. One disclosed embodiment of the present invention enables a simple mounting, in particular. For the case where the mirror is not intended to have any illumination, a larger mirror can be used in this disclosed embodiment of the present invention, without changing the frame, which reduces the equipment diversity, for example in motor vehicle mounting.

The mirror according to the invention is suitable in particular for arrangement at vehicle interior trim parts. Therefore, a further subject matter of the present invention is a vehicle interior trim part having the mirror according to the invention.

The vehicle interior trim part is preferably a sun visor or a headrest, in each of which the mirror according to the invention is arranged.

BRIEF DESCRIPTION OF THE DRAWINGS

The invention is explained below with reference to FIGS. 1 to 3. These explanations are merely by way of example and do not restrict the general concept of the invention. The explanations apply equally to both subject matters of the invention.

DETAILED DESCRIPTION OF THE PREFERRED EMBODIMENT

Figure 1:
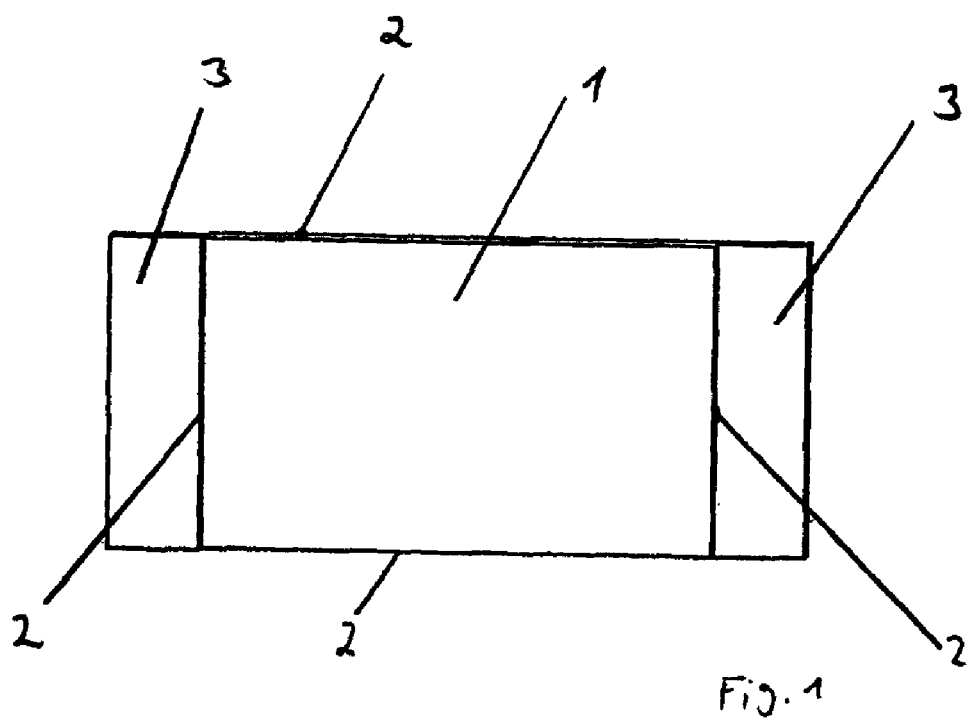
FIG. 1 shows the mirror according to the invention in plan view.

FIG. 1 illustrates a mirror 1 according to one embodiment of the invention. In the present case, the mirror 1 is configured in rectangular fashion and has a respective OLED 3 at the right-hand and the left-hand surface of the periphery 2 of said mirror. The OLED is a reflective OLED, which acts like a mirror in the non-driven (i.e., non-energized) state, such that the surfaces 1 and 3 in the non-driven state of the OLEDs act like a large, essentially homogeneous mirror surface. In the driven state, the reflective OLEDs 3 function as luminaires and, in the case of a vanity mirror, illuminate for example the observer's face.

Figure 2:
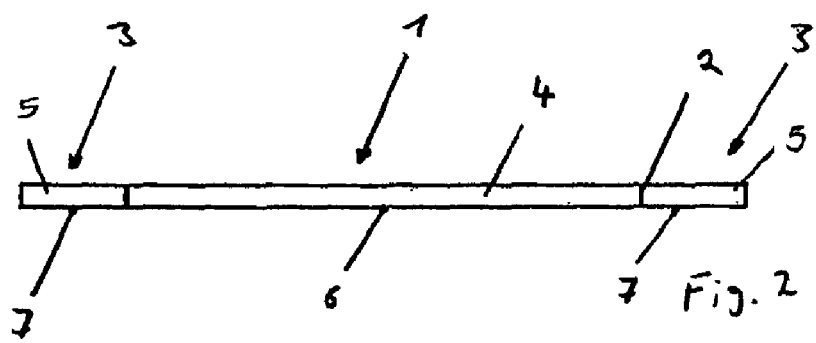
FIG. 2 shows the mirror according to the invention in accordance with FIG. 1 in a side view.

FIG. 2 illustrates a side view of the mirror in accordance with FIG. 1. This view reveals that the mirror 1 comprises a substrate 4, a glass substrate in the present case, which has a reflective surface 6 at its rear side. The OLEDs 3 are identified by the reference symbol 5 and have a reflective surface 7 at their rear side. The OLED 3 comprises a covering plate, a substrate and also an OLED layer with electrodes, which are identified jointly by the reference symbol 5. The reflective layers 6, 7 reflect impinging light up to about 100%. In the non-driven state, the surfaces 1, 3 act as a continuous mirror surface.

Figure 3:
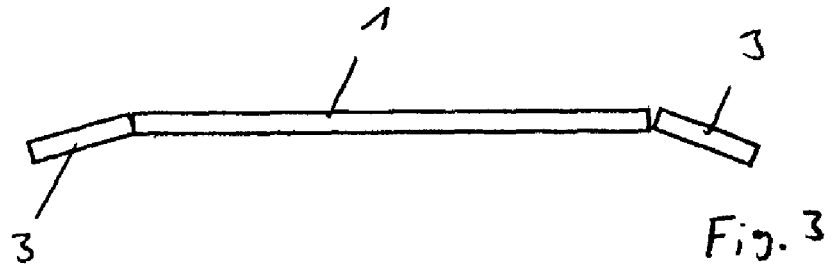
FIG. 3 shows a further embodiment of the mirror in accordance with FIG. 1.

FIG. 3 illustrates a further embodiment of the mirror in accordance with FIGS. 1 and 2. The mirror in accordance with FIG. 3 essentially corresponds to the mirror in accordance with FIGS. 1 and 2, in the present case the OLEDs 3 being arranged in angular fashion with respect to the mirror 1. This embodiment of the present invention has the advantage that the observer of the mirror is illuminated better, that said observer is dazzled to a lesser extent by the light from the OLEDs, and that the OLEDs in the turned-off state generate a three-dimensional mirror image. The person skilled in the art recognizes that it is also possible for a plurality of OLEDs to be arranged alongside one another which, relative to the paper plane, can have a different angle and/or a different curvature.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

LIST OF REFERENCE SYMBOLS

1 Mirror
2 Periphery
3 OLED
4 Substrate, glass
5 OLED
6, 7 Reflective surfaces

The invention claimed is:

1. A mirror for a motor vehicle, mirror part comprising:
a mirror (1) that is distinct from said at least one OLED having a generally planar substrate (4) backed by a reflective surface (6), and at least one peripheral edge (2); and
at least one organic light emitting diode OLED (3) disposed in abutting contact with said peripheral edge (2) of said mirror (1);
wherein said OLED (3) includes a reflective back surface (7);
wherein said reflective back surface (6) of said mirror (1) and said reflective back surface (7) of said OLED (3) are arranged in a common plane.

2. The mirror as claimed in claim 1, further characterized in that said peripheral edge is quadrangular, and in that said OLED (3) is arranged at least one part of the quadrangular peripheral edge of said mirror.

3. The mirror as claimed in claim 2, further characterized in that a respective OLED (3) is arranged at two opposite parts of said quadrangular peripheral edge of said mirror.

4. The mirror as claimed in claim 1, further characterized in that said mirror and said OLED (3) are arranged in a mirror cassette.

5. A vehicle interior trim part having a mirror as claimed in claim 1.

6. The vehicle interior trim part as claimed in claim 5, further characterized in that said trim part is a sun visor.

7. The vehicle interior trim part as claimed in claim 5, further characterized in that said trim part is a headrest.

\* \* \* \* \*